(12) United States Patent
Halder et al.

(10) Patent No.: US 10,077,052 B2
(45) Date of Patent: Sep. 18, 2018

(54) STATE-BASED OPERATION FOR AUTONOMOUS VEHICLES

(71) Applicant: Faraday&Future Inc., Gardena, CA (US)

(72) Inventors: Bibhrajit Halder, Sunnyvale, CA (US); Chongyu Wang, San Jose, CA (US); Kenneth X. Xie, Manhattan Beach, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/475,048

(22) Filed: Mar. 30, 2017

(65) Prior Publication Data

US 2017/0297576 A1 Oct. 19, 2017

Related U.S. Application Data

(60) Provisional application No. 62/316,357, filed on Mar. 31, 2016.

(51) Int. Cl.
| | |
|---|---|
| *B60W 30/182* | (2012.01) |
| *G01C 21/34* | (2006.01) |
| *G08G 1/017* | (2006.01) |
| *B60W 30/18* | (2012.01) |

(52) U.S. Cl.
CPC .... *B60W 30/182* (2013.01); *B60W 30/18109* (2013.01); *B60W 30/18163* (2013.01); *G01C 21/34* (2013.01); *G08G 1/017* (2013.01); *B60W 2540/30* (2013.01); *B60W 2550/302* (2013.01); *B60W 2720/10* (2013.01)

(58) Field of Classification Search
CPC ......... B60W 30/182; B60W 30/18109; B60W 30/18163; B60W 2540/30; G01C 21/34; G08G 1/017
USPC .......................... 701/26, 45, 31.4, 41, 23, 36
See application file for complete search history.

(56) References Cited

U.S. PATENT DOCUMENTS

| | | | |
|---|---|---|---|
| 2004/0193347 A1* | 9/2004 | Harumoto | B60R 21/0132 701/45 |
| 2010/0292886 A1* | 11/2010 | Szczerba | G01C 21/365 701/31.4 |
| 2015/0166062 A1* | 6/2015 | Johnson | B60W 30/12 701/41 |
| 2015/0321699 A1* | 11/2015 | Rebhan | B60Q 9/00 701/23 |

(Continued)

*Primary Examiner* — Tan Q Nguyen
(74) *Attorney, Agent, or Firm* — Skyler R. Lund

(57) ABSTRACT

A system for operating a vehicle is disclosed. The vehicle is operated in a first driving state corresponding to a first set of logic for operating the vehicle, the first set of logic including logic for performing a first action at the vehicle in response to a determination that a first condition exists in the surroundings of the vehicle. That state change criteria for transitioning from the first driving state to a second driving state are satisfied is determined. In response to the determination, the vehicle is operated in the second driving state corresponding to a second set of logic, different from the first set of logic, for operating the vehicle, the second set of logic including logic for performing a second action, different from the first action, at the vehicle in response to a determination that the first condition exists in the surroundings of the vehicle.

18 Claims, 3 Drawing Sheets

(56) References Cited

U.S. PATENT DOCUMENTS

2016/0193997 A1\* 7/2016 Yellambalase ........ B60W 30/08
　　　　　　　　　　　　　　　　　　　　　701/36

\* cited by examiner

STATE-BASED OPERATION FOR AUTONOMOUS VEHICLES

FIELD OF THE DISCLOSURE

This relates generally to state-based driving operation for autonomous vehicles, and more particularly, to transitioning between driving states in accordance with detected conditions in the vehicles' surroundings.

BACKGROUND OF THE DISCLOSURE

Vehicles, especially automobiles, increasingly include various sensors for detecting and gathering information about the vehicles' surroundings. Autonomous vehicles can use such information for performing autonomous driving operations. However, existing autonomous driving solutions are limited in their ability to comprehensively and effectively address various conditions encountered by the vehicles in their surroundings.

SUMMARY OF THE DISCLOSURE

Examples of the disclosure are directed to state-based autonomous driving operation. A vehicle can transition between states in response to determining that certain conditions exist in the vehicle's surroundings. Once operating in a given state, vehicle behavior can be controlled by the logic and procedures associated with that given state, which can be tailored to the conditions that caused the vehicle to transition to the given state. In this way, the vehicle can easily and effectively adapt to many different conditions encountered by the vehicle (e.g., by transitioning to a state corresponding to those conditions).

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some vehicles, such as automobiles, may include various sensors for detecting and gathering information about the vehicles' surroundings. Autonomous vehicles can use such information for performing autonomous driving operations. However, existing autonomous driving solutions are limited in their ability to comprehensively and effectively address various conditions encountered by the vehicles in their surroundings. Examples of the disclosure are directed to state-based autonomous driving operation. A vehicle can transition between states in response to determining that certain conditions exist in the vehicle's surroundings. Once operating in a given state, vehicle behavior can be controlled by the logic and procedures associated with that given state, which can be tailored to the conditions that caused the vehicle to transition to the given state. In this way, the vehicle can easily and effectively adapt to many different conditions encountered by the vehicle (e.g., by transitioning to a state corresponding to those conditions).

Figure 1:
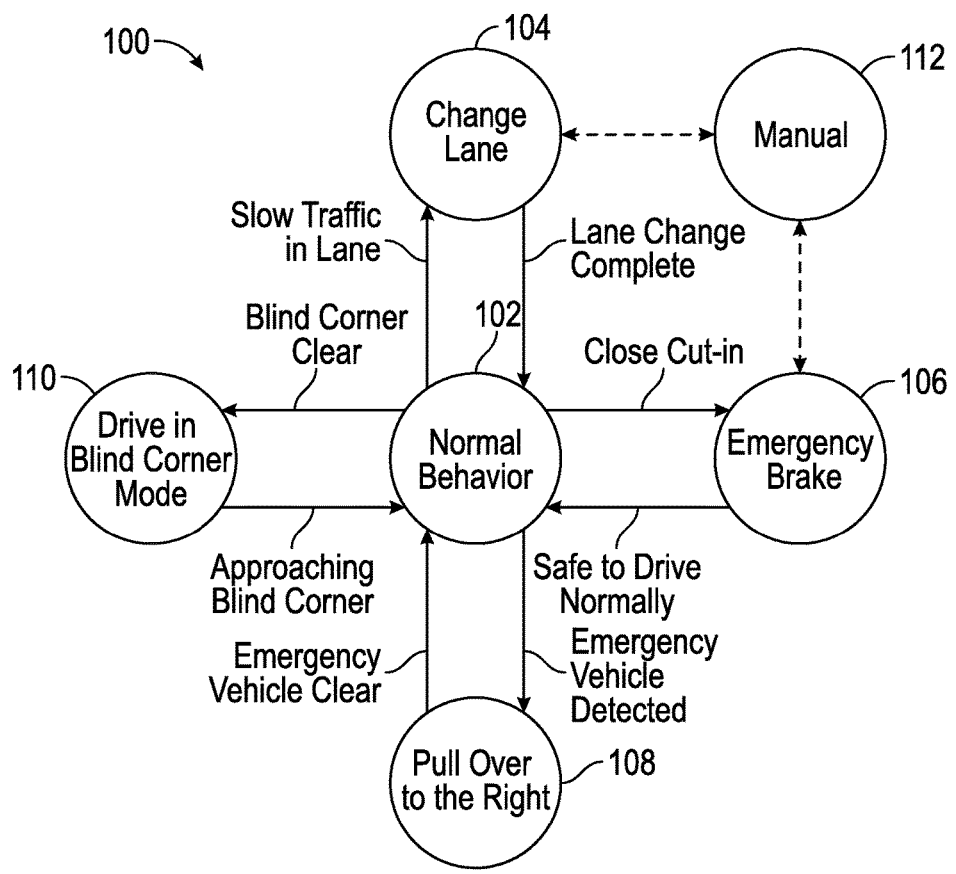
FIG. 1 illustrates an exemplary state diagram including various driving states in which a vehicle can operate according to examples of the disclosure.

FIG. 1 illustrates exemplary state diagram 100 including various driving states in which a vehicle can operate according to examples of the disclosure. Each of driving states 102, 104, 106, 108 and 110 can correspond to a set of driving logic or procedures for controlling the vehicle while the vehicle is operating in a respective driving state. For example, while the vehicle is operating in driving state 102 (e.g., corresponding to a normal behavior driving state, as will be described in more detail below) the vehicle can operate according to a first set of driving logic or procedures, which can define how the vehicle will react to different circumstances that it encounters while operating in driving state 102 (e.g., the minimum distance to leave between the vehicle and a second vehicle the vehicle is following, whether to change lanes to avoid an obstacle or stay in the vehicle's current lane and brake to avoid the obstacle, etc.). On the other hand, when the vehicle is operating in a different state (e.g., driving state 104, corresponding to a change lane driving state), the vehicle can operate according to a second set of driving logic or procedures, which can be different from the first set of driving logic or procedures. As such, the vehicle can react differently to the same encountered condition or circumstance depending on in which driving state the vehicle is operating. For example, in some driving states, the vehicle may be biased towards using its emergency brake more than in other states, such that if an unexpected obstacle appears in front of the vehicle while in one of those driving states, it may react by applying its emergency brake as opposed to applying regular brakes while in other states. Though each driving state can be associated with its own unique set of driving logic or procedures, it may be the case that different driving states can share some or all driving logic or procedures. Further, in some examples, the vehicle can transition between driving states while continuing to follow a particular route (e.g., from an initial location to a final destination)—in one driving state, the vehicle can follow the route while operating according to a first set of logic, and in another driving state, the vehicle can follow the route while operating according to a second set of logic. However, in some examples, a change in driving state can be accompanied by a change in vehicle route, in accordance with the examples of the disclosure (e.g., when an accident on the vehicle's route causes the vehicle to transition into an alternate route driving state and determine an alternate route to reach its final destination).

In some examples, while operating in a given driving state, the vehicle can continuously or periodically monitor conditions surrounding the vehicle to determine whether a transition to another driving state is warranted, and to which driving state the vehicle should transition. The vehicle can make the above determinations using any suitable decision making algorithm, such as a Partially Observed Markov Decision Process (POMDP), exemplary techniques for which are described in White III, Chelsea C., "A survey of solution techniques for the partially observed Markov decision process," *Annals of Operations Research* 32.1 (1991):

215-230, which is hereby incorporated by reference in its entirety for all purposes. The vehicle can monitor its surroundings using any number of sensors and information sources, such as ultrasonic sensors, laser sensors, radar sensors, optical cameras, LIDAR sensors, any other sensors that can be used to detect one or more characteristics about the vehicle's surroundings, and external sources of information, such as real time information about the traffic in the vehicle's surrounding (or about the traffic on the vehicle's route) received from an internet connection to the vehicle. In some examples, each driving state can be associated with criteria for transitioning out of that driving state, and/or criteria for transitioning into that driving state. For example, driving state 102 can be associated with a first set of criteria for transitioning out of driving state 102 (e.g., criteria that is satisfied when information about the vehicle's surroundings indicates that the vehicle should not remain in driving state 102), such that if, while operating in driving state 102, the vehicle determines that the first set of criteria is satisfied, it automatically (e.g., without driver input) initiates operations to transition away from operating in driving state 102. Additionally, driving state 106, for example, can be associated with a second set of criteria for transitioning into driving state 106 (e.g., criteria that is satisfied when information about the vehicle's surroundings indicates that the vehicle should transition into driving state 106), such that if, in response to the vehicle determining that a driving state change is warranted, the vehicle determines that the second set of criteria is satisfied, it automatically (e.g., without driver input) initiates operations to transition into driving state 106. Other driving states can similarly be associated with criteria for transitioning out of those driving states, and criteria for transitioning into those driving states.

In some examples, one or more of the driving states may not be associated with criteria for transitioning out of those driving states. Instead, while the vehicle is operating in a particular driving state, it may continuously or periodically monitor conditions in its surroundings. Upon determining that the conditions in its surroundings satisfy criteria for transitioning into another driving state (rather than criteria for transitioning out of the particular driving state), the vehicle can both transition out of the particular driving state and transition into the other driving state in accordance with the satisfaction of the criteria for transitioning into the other driving state. In some examples, a given set of conditions in the vehicle's surroundings will only correspond to a single driving state (e.g., the given set of conditions trigger a determination that the vehicle should transition into a single particular driving state), while in some examples, a given set of conditions in the vehicle's surroundings may correspond to more than one driving state (e.g., the given set of conditions trigger a determination that the vehicle should transition into multiple candidate driving states). In such examples, the vehicle can transition to a respective driving state of the multiple candidate driving states based on a predefined priority ordering of the driving states (e.g., a predefined hierarchy of driving states, such that the vehicle transitions to the driving state with the highest position in the driving state hierarchy of the multiple candidate driving states).

Some exemplary driving states according to examples of the disclosure will now be described. As previously mentioned, driving state 102 can correspond to a normal behavior driving state in which the vehicle can initially operate when it starts on its current route. For example, the vehicle can be a fully- or semi-autonomous vehicle, and a driver of the vehicle can enter a destination on a navigation system of the vehicle. The vehicle can plan its route to reach the destination, and can begin driving itself (or assist the driver in driving) to the destination while operating in driving state 102 and following its planned route. The vehicle can remain in driving state 102 as long as conditions in its surroundings do not dictate that transition to another state is warranted (e.g., as long as objects or obstacles, or other conditions in the vehicle's surroundings, do not prevent the vehicle from following its initial route/plan). As an example, driving state 102 can correspond to having the vehicle in adaptive cruise control mode with automatic braking engaged. The vehicle can also automatically detect or be aware of stop signs and/or traffic lights along the planned route and can react accordingly. Furthermore, in driving state 102, the vehicle can automatically make turns along the planned route.

Driving state 104 can correspond to a lane change driving state to which the vehicle can transition if conditions in the vehicle surroundings dictate that the vehicle should change lanes from its current lane. For example, if the vehicle determines that traffic in its current lane is slowing down, and traffic flow in another lane is faster than the traffic in the vehicle's current lane, the vehicle can automatically transition from driving state 102 to driving state 104. The logic or procedures associated with driving state 104 can be specific to driving state 104 for ensuring a successful lane change is completed. The vehicle can operate in driving state 104 until the lane change is complete, at which point it can transition back to driving state 102. In some examples, the vehicle can operate in driving state 104 for a predetermined amount of time before transitioning back to driving state 102. In some examples, the vehicle can remain in driving state 104 until criteria for transitioning back into driving state 102 (or for transitioning into another driving state from driving state 104) are satisfied. In some examples, the vehicle must transition back into driving state 102 before being able to transition into another driving state (e.g., all driving state changes are between driving state 102 and another driving state). In some examples, the vehicle is able to transition from any driving state into any other driving state without first needing to transition to driving state 102. The above-described driving state transition details can apply analogously to other driving states, described below, but will not be repeated for brevity.

Driving state 106 can correspond to an emergency braking driving state into which the vehicle can automatically transition if conditions in the vehicle's surroundings dictate that the vehicle should apply (or be ready to apply) emergency braking procedures. For example, if the vehicle determines that an object has quickly and/or unexpectedly moved into the vehicle's path, and poses a risk of colliding with the vehicle (e.g., the object is within a threshold distance of the vehicle), the vehicle can transition into driving state 106. The logic or procedures in driving state 106 can be specific to driving state 106 for avoiding a collision with the object. For example, while in driving state 106, the vehicle can be prepared to apply its emergency brakes to bring the vehicle to a quick stop, if needed, and can increase a confidence factor in its rear sensor information (e.g., increase the weight given to information received from sensors for detecting conditions in the vehicle's rear surroundings when making various autonomous driving determinations). In this way, the vehicle can apply maximum braking power while maintaining safe distance (e.g., greater than a predetermined distance) from a trailing vehicle, so as to avoid collision with the trailing vehicle as well as the object. The vehicle can transition out of driving state 106 in response to determining that conditions in its surroundings indicate that it is safe to do so (e.g., can transition back into driving state 102 in response to determining that the vehicle will not collide with the object).

Driving state 108 can correspond to an emergency vehicle driving state into which the vehicle can automatically transition if the vehicle determines that an emergency vehicle (e.g., a police car, a fire truck, an ambulance, etc.) is approaching the vehicle. The logic or procedures in driving state 108 can be specific to driving state 108 for safely pulling over to the side of the road to allow the emergency vehicle to pass. For example, while in driving state 108, the vehicle can focus its sensors on conditions to the vehicle's right (e.g., if the vehicle is pulling over to the right side of the road) to identify a path to move over to the right side of the road that is clear of obstacles. The vehicle can follow the identified path while monitoring other objects or vehicles to the vehicle's right to avoid collisions with those objects or vehicles. In this way, the vehicle can quickly and safely move to the right side of the road to allow the emergency vehicle to pass. The vehicle can transition out of driving state 108 in response to determining that the emergency vehicle has passed (e.g., can transition back into driving state 102).

Driving state 110 can correspond to a blind corner driving state into which the vehicle can automatically transition if the vehicle determines that it is approaching a corner or curve into which the vehicle has no or limited visibility (e.g., the vehicle has no or limited information about conditions in the blind corner, such as road curvature, existence of objects or vehicles, etc.). The logic or procedures in driving state 110 can be specific to driving state 110 for safely driving into and through a blind corner. For example, while in driving state 110, the vehicle can slow down and be prepared to make quick changes to its driving speed (e.g., with its brakes or its accelerator) or direction (e.g., with its steering mechanisms) in case the vehicle identifies a previously unknown object or obstacle in the vehicle's path while in the blind corner. In this way, the vehicle can safely navigate the blind corner. The vehicle can transition out of driving state 110 in response to determining that it has passed through the blind corner (e.g., can transition back into driving state 102).

The driving states illustrated in FIG. 1 and described above are exemplary only, and it is understood that additional or alternative driving states can be employed. For example, the vehicle can have access to a driving state for following a lead vehicle and keeping within a current lane on a highway. The vehicle can automatically enter this driving state when it determines that it is on a highway, and another vehicle (e.g., a lead vehicle) is in front of the vehicle and in the same lane as the vehicle. The logic or procedures in this driving state can be specific to this driving state and can cause the vehicle to be biased against using its emergency brakes, and can cause the vehicle to determine the curvature of the road on which the vehicle is traveling based, to a greater extent, on the movements of the lead vehicle (e.g., inputs from the sensors detecting the movements of the lead vehicle can have a relatively high confidence factor) and, to a lesser extent, on other sensor data to which the vehicle may have access (e.g., maps, optical sensors for identifying the curvature of the road, etc., where inputs from the sensors providing such information can have a relatively low confidence factor). In contrast, in other driving states, the vehicle may have determined the curvature of the road on which the vehicle is traveling based, to a lesser extent, on the movements of the lead vehicle and, to a greater extent, on other sensor data to which the vehicle may have access. As another example, the vehicle can have access to a driving state for determining an alternative route to its destination in response to identifying an accident on the vehicle's current route. In this driving state, the vehicle can focus on finding an alternative route, and changing its course to that alternative route without colliding with other objects or vehicles in the vehicle's surroundings. In some examples, driving states can correspond to various driving styles such as cruising or relaxed (e.g., a state that provides a relatively relaxing experience for the occupants of the vehicle where lane changes and hard braking are minimized by maintaining a relatively moderate cruising speed and a relative large distance with the vehicle in front) or hurried (e.g., a state where the autonomous mode is tuned to get to the destination as quickly as possible where the cruising speed is set to, for example, the maximum speed limit and constant lane changing is preferred if the cruising speed cannot be maintained). In these examples, each state can incorporate some of the exemplary states shown in FIG. 1. The vehicle can automatically transition from the cruising state to the hurried state if it determines that it cannot reach the destination within a certain period of time while driving in the cruising state, which can be manually input by the driver or automatically pulled from the calendar on the driver's personal device (e.g., the vehicle can determine that it needs to reach its destination in time for the driver's next meeting in his calendar). Alternatively the vehicle can automatically transition from the hurried state to the cruising state if it receives an input from the user or another device indicating that more time is available to reach the destination (e.g., the vehicle is going to the airport and the flight has been delayed, thus giving the vehicle more time to reach its destination).

In some examples, the driving states, and their associated logic and procedures, to which the vehicle has access can be predefined (e.g., defined before the vehicle starts on its route). In some examples, the vehicle can have access to a default driving state into which the vehicle can transition in response to determining that it should transition out of its current driving state, but that the criteria for transitioning into other existing driving states are not satisfied. In some examples, the default driving state can prompt the driver of the vehicle for input on how the vehicle should handle the current conditions in its surroundings (e.g., alert the driver to manually take over vehicle driving operation). In some examples, a manual driving mode can be the default driving state, or another one of the driving states available to the vehicle (e.g., driving state 112 in FIG. 1). In some examples, the vehicle can transition into driving state 112 from any of the other driving states available to it, and can transition out of driving state 112 into any of the other driving states available to it (e.g., as described above and/or with reference to other driving states in this disclosure). In the manual driving mode, the driver can be required to manually control various aspects of driving the vehicle (e.g., steering input, braking, etc.). Where the manual driving mode is the default driving state (e.g., driving state 102 in FIG. 1), a drive input (e.g., a button press from the driver) can be required to enter into any of the other driving states. In some examples, the vehicle can add new driving states as it encounters conditions in its surroundings that it has previously not encountered and has no current driving state corresponding to such conditions. In such examples, the vehicle can monitor the driver's reactions to those conditions, and can add new driving states that associate the above conditions with the driver's reactions to those conditions. As such, in the future, if the vehicle encounters such conditions again, it can automatically transition to the new driving state and can automatically react to those conditions as the driver had previously reacted to those conditions (or based on how the driver had previously reacted to those conditions).

Figure 2:
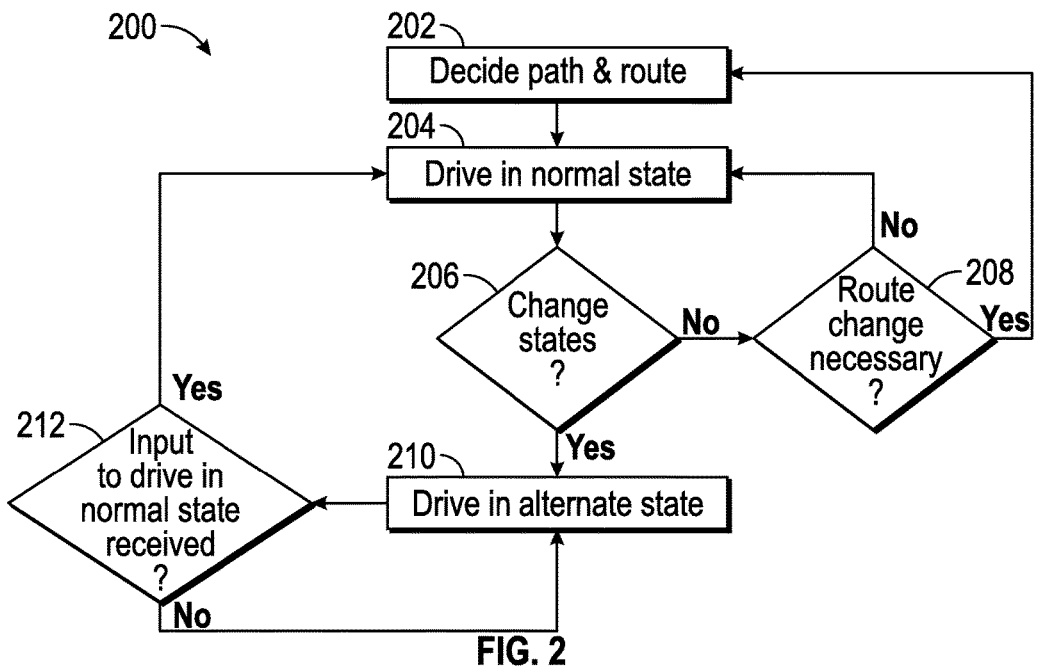
FIG. 2 illustrates an exemplary process for operating a vehicle in one or more driving states according to examples of the disclosure.

FIG. 2 illustrates an exemplary process 200 for operating a vehicle in one or more driving states according to examples of the disclosure. At 202, the vehicle can determine its path and/or route for traveling from an initial location to a final destination. For example, a driver of the vehicle can enter a final destination in the vehicle's navigation system, and the vehicle can determine how to travel from its current location to the final destination.

At 204, the vehicle can begin driving (e.g., autonomously or semi-autonomously) to the final destination according to the path and/or route determined at step 202. In some examples, the vehicle can begin driving to the final destination in a normal behavior driving state (e.g., driving state 102 in FIG. 1).

At 206, the vehicle can determine whether a change in driving state is warranted (e.g., as described with reference to FIG. 1). The vehicle can continuously or periodically monitor whether a change in driving state is warranted at 206 while operating in the normal behavior driving state. In some examples, the vehicle can make the determination at 206 based at least in part on anticipated or predicted behavior of objects and vehicles in the vehicle's surroundings. For example, if the vehicle predicts that a nearby vehicle is going to enter the vehicle's path (e.g., based on current and/or past behaviors or movements of that vehicle), the vehicle can determine that a change in driving state is warranted, despite the other vehicle not having yet entered the vehicle's path. Other predictive tracking determinations of surrounding objects or vehicles are analogously contemplated in accordance with the examples of the disclosure.

If the vehicle determines that no change of driving state is warranted at 206, the vehicle can determine whether a change in its route is warranted at 208. For example, if the vehicle determines that traffic conditions on the vehicle's current route or other occurrences warrant a change in the vehicle's current route to its final destination, process 200 can proceed from step 208 to 202, and the vehicle's current route can be modified at 202 based on the traffic conditions or other occurrences. If the vehicle determines that no change in its route is warranted at 208, process 200 can proceed to step 204.

If the vehicle determines that a change of driving state is warranted at 206, process 200 can proceed to step 210 in which the vehicle can transition to an alternate driving state and can drive in the alternate driving state (e.g., as described with reference to FIG. 1).

Following step 210, at 212, the vehicle can determine whether input to return to the normal driving state (e.g., driving state 102 in FIG. 1) has been received. In some examples, the input to return to the normal driving state can be an explicit user input (e.g., a user pressing a button). In some examples, the input to return to the normal driving state can comprise an automatic determination by the vehicle to return to the normal driving state (e.g., as described with reference to FIG. 1). Further, in some examples, the vehicle can transition to a different driving state rather than back to the normal driving state, as described with reference to FIG. 1. If the vehicle determines that input to return to the normal driving state is received at 212, process 200 can proceed to step 204 in which the vehicle can drive in the normal driving state. If the vehicle determines that input to return to the normal driving state is not received at 212, process 200 can return back to step 210 to remain in the alternate driving state.

Figure 3:
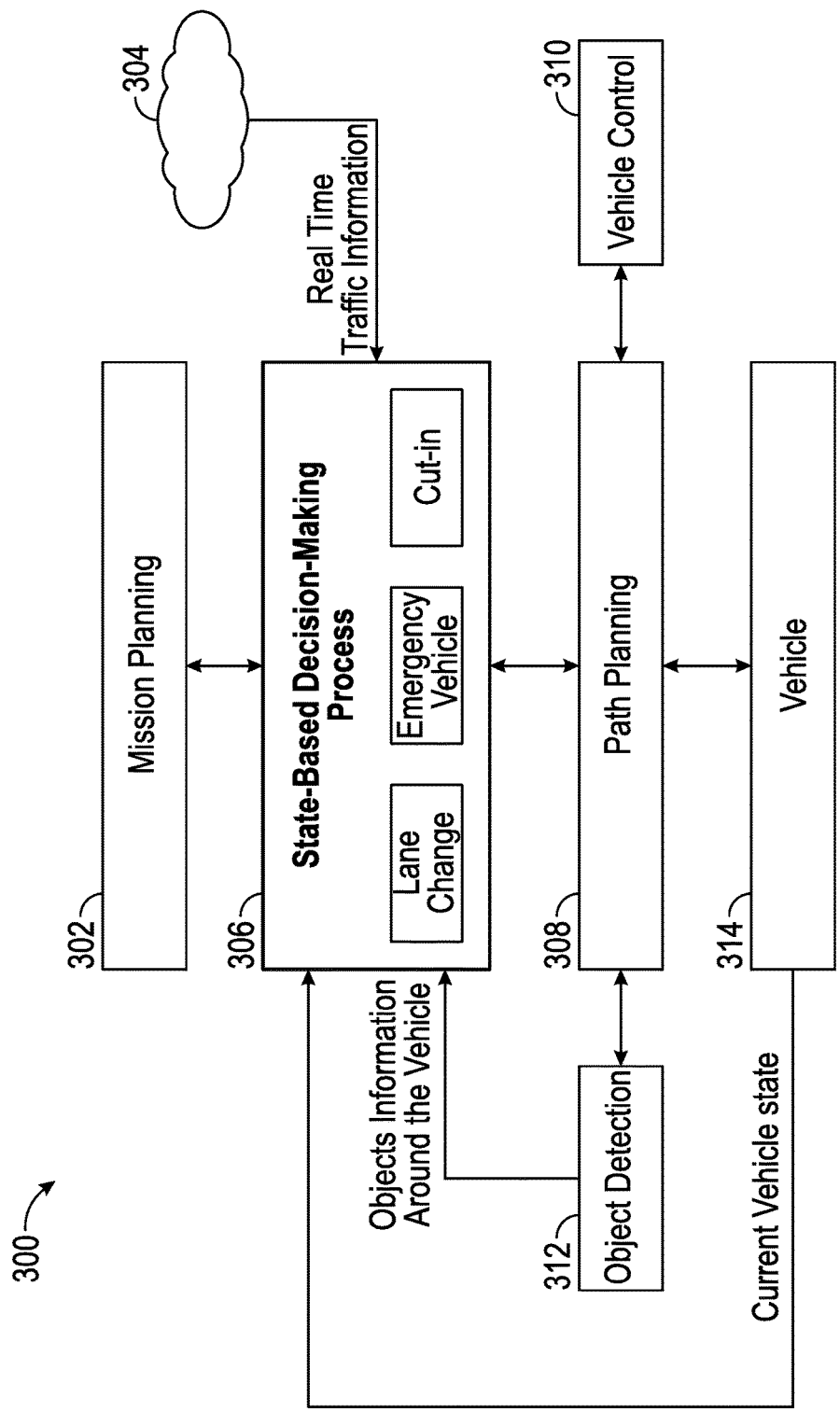
FIG. 3 illustrates an exemplary system block diagram of a driving state system according to examples of the disclosure.

FIG. 3 illustrates an exemplary system block diagram of driving state system 300 according to examples of the disclosure. The driving state system 300 can implement the driving state operations described with reference to FIGS. 1-2. Mission planning block 302 can determine the current objective(s) of the vehicle (e.g., traveling from an initial location to a final destination), as previously described, and path planning block 308 can determine particular path(s) for the vehicle to take to achieve the above objective(s) (e.g., which streets to take, in which lanes to travel, etc.). State-based decision making process block 306 can determine whether to remain in a current driving state, whether to transition out of the current driving state and/or into which driving state to transition (e.g., a lane change driving state, an emergency vehicle avoidance driving state, and a close cut-in driving state, among others). State-based decision making process block 306 can make determinations as described above with reference to FIGS. 1-2, which can be based on inputs such as real time traffic information 304 (e.g., received from an internet connection), the current state of the vehicle (e.g., received from vehicle block 314), information about objects in the vehicle's surroundings (e.g., received from object detection block 312) and/or information about the current path(s) of the vehicle (e.g., received from path planning block 308). In some examples, as previously described, object detection block 312 can predict the behaviors or movements of objects or vehicles in the vehicle's surroundings, and can provide information indicative of such predictions to state-based decision making process block 306 for use in state change determinations. Path planning block 308 can control the vehicle using vehicle control block 310 based on the current state of the vehicle and/or the current path(s) of the vehicle, as previously described (e.g., to maintain the current driving characteristics of the vehicle, to change the current driving characteristics of the vehicle to avoid collision with an object, etc.).

Figure 4:
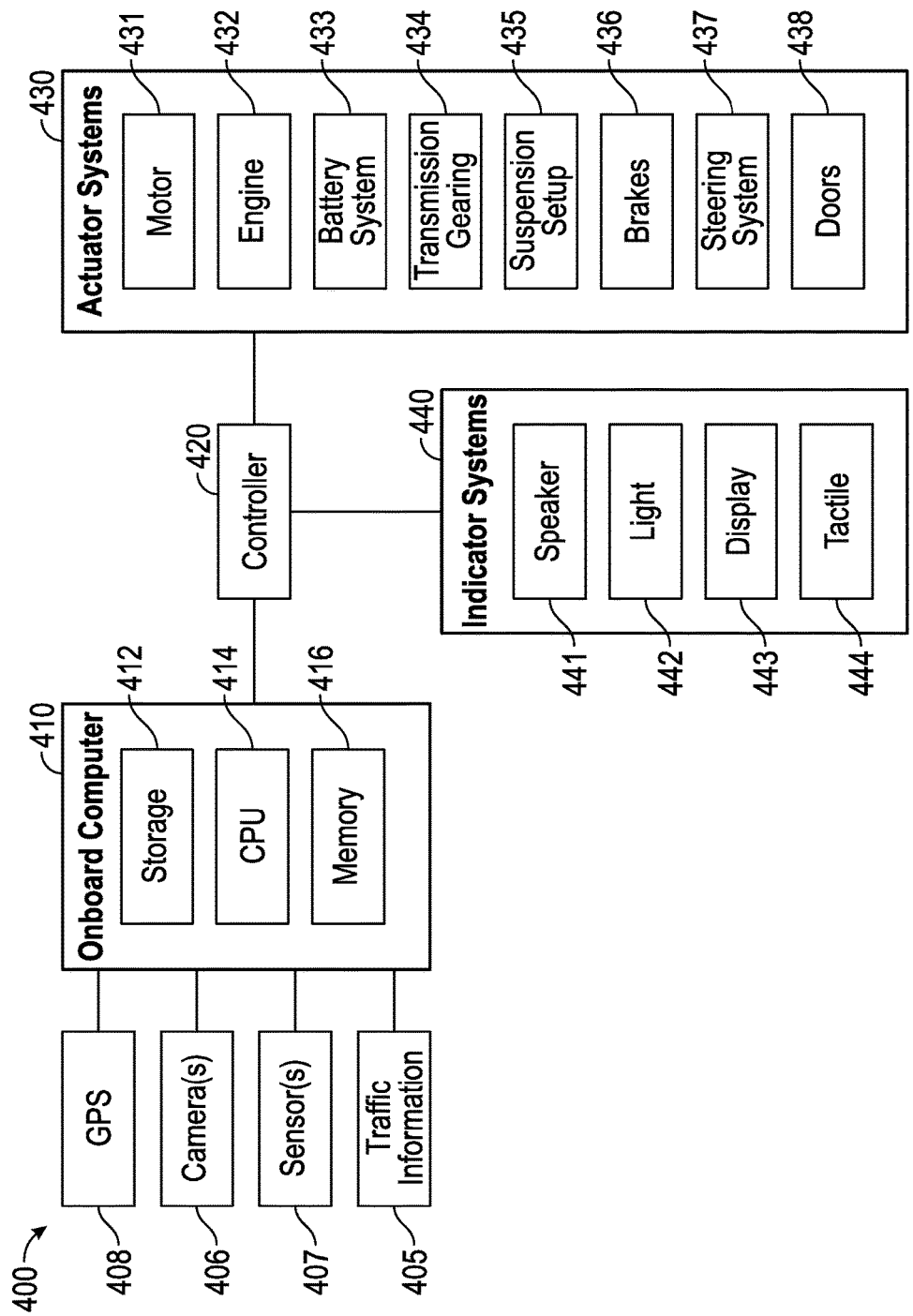
FIG. 4 illustrates an exemplary system block diagram of a vehicle control system according to examples of the disclosure.

FIG. 4 illustrates an exemplary system block diagram of vehicle control system 400 according to examples of the disclosure. Vehicle control system 400 can perform any of the methods described with reference to FIGS. 1-3. System 400 can be incorporated into a vehicle, such as a consumer automobile. Other example vehicles that may incorporate the system 400 include, without limitation, airplanes, boats, or industrial automobiles. Vehicle control system 400 can include one or more cameras 406 capable of capturing image data (e.g., video data) for determining various characteristics of the vehicle's surroundings, as described with reference to FIGS. 1-3. Vehicle control system 400 can also include one or more other sensors 407 (e.g., radar, ultrasonic, LIDAR, etc.) capable of detecting various characteristics of the vehicle's surroundings, and a Global Positioning System (GPS) receiver 408 capable of determining the location of the vehicle. Vehicle control system 400 can also receive information via an internet connection, such as real time traffic information via a real time traffic information interface 405 (e.g., a cellular internet interface, a Wi-Fi internet interface, etc.). Vehicle control system 400 can include an on-board computer 410 that is coupled to the cameras 406, sensors 407, GPS receiver 408 and real time traffic information interface 405, and that is capable of receiving the image data from the cameras and/or outputs from the sensors 407, the GPS receiver 408 and the real time traffic information interface 405. The on-board computer 410 can be capable of determining whether and how to transition between driving states of the vehicle, as described in this disclosure. On-board computer 410 can include storage 412, memory 416, and a processor 414. Processor 414 can perform any of the methods described with reference to FIGS. 1-3. Additionally, storage 412 and/or memory 416 can store data and instructions (such as settings of various systems of the vehicle in a particular driving state and conditions for transitioning among the driving states) for performing any of the methods described with reference to FIGS. 1-3. Storage 412 and/or memory 416 can be any non-transitory computer readable storage medium, such as a solid-state drive or a hard disk drive, among other possibilities. The vehicle control system 400 can also include a controller 420 capable of controlling one or more aspects of vehicle operation, such as performing autonomous or semi-autonomous driving maneuvers based on the driving state determinations made by the on-board computer 410.

In some examples, the vehicle control system 400 can be connected to (e.g., via controller 420) one or more actuator systems 430 in the vehicle and one or more indicator systems 440 in the vehicle. The one or more actuator systems 430 can include, but are not limited to, a motor 431 or engine 432, battery system 433, transmission gearing 434, suspension setup 435, brakes 436, steering system 437 and door system 438. The vehicle control system 400 can control, via controller 420, one or more of these actuator systems 430 during vehicle operation; for example, to open or close one or more of the doors of the vehicle using the door actuator system 438, to control the vehicle during autonomous driving or parking operations, which can utilize the driving state determinations made by the on-board computer 410, using the motor 431 or engine 432, battery system 433, transmission gearing 434, suspension setup 435, brakes 436 and/or steering system 437, etc. The one or more indicator systems 440 can include, but are not limited to, one or more speakers 441 in the vehicle (e.g., as part of an entertainment system in the vehicle), one or more lights 442 in the vehicle, one or more displays 443 in the vehicle (e.g., as part of a control or entertainment system in the vehicle) and one or more tactile actuators 444 in the vehicle (e.g., as part of a steering wheel or seat in the vehicle). The vehicle control system 400 can control, via controller 420, one or more of these indicator systems 440 to provide indications to a driver of the vehicle of the driving state determinations made by the on-board computer 410 (e.g., to alert the driver to take control of the vehicle if the on-board computer determines that conditions in the vehicle's surroundings warrant driver intervention). For example, the Onboard Computer 410 can store in its memory 416 driving state 102 which includes a particular settings of how the controller 420 controls the motor 431, battery system 433, transmission gearing 434, suspension 435, brakes 436, steering system 437, etc. when the vehicle is in driving state 102. Similarly, the Onboard Computer 410 can also include in its memory 416 program logic that determines whether to switch to a different driving state when the processor receives inputs from one or more of the cameras 406, sensors 406, GPS receiver 408 and/or traffic information 405. When certain conditions are met, as described in this disclosure, the Onboard Computer 410 can instruct the controller 420 to set the actuator systems 430 into a setting corresponding to the new driving state. The Onboard Computer 410 can also receive inputs from the cameras 406, sensors 406, GPS receiver 408 and/or traffic information 405 and control the actuator systems 430 while the vehicle is in a particular driving state.

Thus, the examples of the disclosure provide various ways to operate a vehicle in accordance with predefined driving states corresponding to different conditions in the vehicle's surroundings.

Therefore, according to the above, some examples of the disclosure are directed to a system comprising: one or more processors; and a memory including instructions, which when executed by the one or more processors, cause the one or more processors to perform a method comprising: operating a vehicle in a first driving state, the first driving state corresponding to a first set of logic for operating the vehicle, the first set of logic including logic for performing a first action at the vehicle in response to a determination that a first condition exists in the surroundings of the vehicle; while operating the vehicle in the first driving state, determining that state change criteria for transitioning from the first driving state to a second driving state are satisfied; and in response to the determination, operating the vehicle in the second driving state, the second driving state corresponding to a second set of logic, different from the first set of logic, for operating the vehicle, the second set of logic including logic for performing a second action, different from the first action, at the vehicle in response to a determination that the first condition exists in the surroundings of the vehicle. Additionally or alternatively to one or more of the examples disclosed above, in some examples, the method further comprises: while operating the vehicle in the second driving state, determining that respective state change criteria for transitioning from the second driving state to a respective driving state are satisfied; and in response to the determination: in accordance with a determination that the respective state change criteria comprise state change criteria for transitioning from the second driving state to a third driving state, operating the vehicle in the third driving state, different from the first and second driving states; and in accordance with a determination that the respective state change criteria comprise state change criteria for transitioning from the second driving state to the first driving state, operating the vehicle in the first driving state. Additionally or alternatively to one or more of the examples disclosed above, in some examples, determining that the state change criteria for transitioning from the first driving state to the second driving state are satisfied is based on traffic characteristics in the vehicle's surroundings. Additionally or alternatively to one or more of the examples disclosed above, in some examples, the traffic characteristics are detected by one or more sensors on the vehicle. Additionally or alternatively to one or more of the examples disclosed above, in some examples, determining that the state change criteria for transitioning from the first driving state to the second driving state are satisfied is based on characteristics of objects detected in the vehicle's surroundings. Additionally or alternatively to one or more of the examples disclosed above, in some examples, determining that the state change criteria for transitioning from the first driving state to the second driving state are satisfied is independent of user input to the vehicle. Additionally or alternatively to one or more of the examples disclosed above, in some examples, operating the vehicle in the first driving state occurs while the vehicle is following a predetermined route from a first location to a second location, and operating the vehicle in the second driving state comprises operating the vehicle in the second driving state while continuing to follow the predetermined route from the first location to the second location. Additionally or alternatively to one or more of the examples disclosed above, in some examples, operating the vehicle in the first driving state occurs while the vehicle is following a predetermined route from a first location to a second location, and operating the vehicle in the second driving state comprises: adjusting the predetermined route to create an updated route from the first location to the second location; and operating the vehicle to follow the updated route from the first location to the second location. Additionally or alternatively to one or more of the examples disclosed above, in some examples, the method further comprises: determining, at a first time, that a second condition exists in the vehicle's surroundings, and that the second condition does not correspond to an existing driving state; and in response to determining that the second condition exists in the vehicle's surroundings, and that the second condition does not correspond to an existing driving state: operating the vehicle in a default driving state, not corresponding to the second condition; while operating the vehicle in the default driving state, monitoring a reaction of the vehicle to the existence of the second condition in the vehicle's surroundings; and creating a new driving state corresponding to the second condition in the vehicle's surroundings, and based on the reaction of the vehicle to the existence of the second condition in the vehicle's surroundings. Additionally or alternatively to one or more of the examples disclosed above, in some examples, the method further comprises: determining, at a second time, after the first time, that the second condition exists in the vehicle's surroundings; and in response to determining that the second condition exists in the vehicle's surroundings, operating the vehicle in the new driving state corresponding to the second condition in the vehicle's surroundings. Additionally or alternatively to one or more of the examples disclosed above, in some examples, operating the vehicle in the first driving state comprises driving the vehicle in a first lane on a road, the state change criteria include a criterion that is satisfied when traffic in the first lane slows down, and traffic in a second lane is faster than the traffic in the first lane, and operating the vehicle in the second driving state comprises changing the vehicle from driving in the first lane to driving in the second lane. Additionally or alternatively to one or more of the examples disclosed above, in some examples, operating the vehicle in the first driving state comprises driving the vehicle on a road, the state change criteria include a criterion that is satisfied when an emergency vehicle is detected on the road in the surroundings of the vehicle, and operating the vehicle in the second driving state comprises moving the vehicle to a side of the road until the emergency vehicle passes the vehicle. Additionally or alternatively to one or more of the examples disclosed above, in some examples, operating the vehicle in the first driving state comprises driving the vehicle on a road, and determining a curvature of the road based on input from a first sensor indicative of characteristics of the road and input from a second sensor indicative of movement of a second vehicle in front of the vehicle, the input from the first sensor having a first confidence factor and the input from the second sensor having a second confidence factor, less than the first confidence factor, and operating the vehicle in the second driving state comprises driving the vehicle on the road, and determining the curvature of the road based on the input from the first sensor and the input from the second sensor, the input from the first sensor having a third confidence factor and the input from the second sensor having a fourth confidence factor, greater than the third confidence factor. Additionally or alternatively to one or more of the examples disclosed above, in some examples, operating the vehicle in the first driving state comprises driving the vehicle on a road at a first speed on a first predefined path based on input from a first sensor indicative of characteristics of objects in front of the vehicle, the state change criteria include a criterion that is satisfied when an object enters the first predefined path within a threshold distance of the vehicle, and operating the vehicle in the second driving state comprises reducing a speed of the vehicle from the first speed based on input from the first sensor indicative of the characteristics of the objects in front of the vehicle and a second sensor indicative of characteristics of objects behind the vehicle. Additionally or alternatively to one or more of the examples disclosed above, in some examples, determining that state change criteria for transitioning from the first driving state to the second driving state are satisfied is independent of driver input. Additionally or alternatively to one or more of the examples disclosed above, in some examples, the first driving state corresponds to a relaxed driving style, the second driving state corresponds to a hurried driving style, and determining that the state change criteria for transitioning from the first driving state to the second driving state are satisfied comprises determining, by the vehicle, that the vehicle will not reach a current destination of the vehicle within a given period of time while operating in the first driving state. Additionally or alternatively to one or more of the examples disclosed above, in some examples, the given period of time is input by a driver of the vehicle. Additionally or alternatively to one or more of the examples disclosed above, in some examples, the given period of time is automatically determined by the vehicle based on an estimated arrival time at the current destination of the vehicle while operating in the first driving state. Additionally or alternatively to one or more of the examples disclosed above, in some examples, while operating the vehicle in the second driving state, determining that state change criteria for transitioning from the second driving state to the first driving state are satisfied, wherein determining that the state change criteria for transitioning from the first driving state to the second driving state are satisfied comprises determining, by the vehicle, that the given period of time has been extended; and in response to the determination, operating the vehicle in the first driving state.

Some examples of the disclosure are directed to a non-transitory computer-readable medium including instructions, which when executed by one or more processors, cause the one or more processors to perform a method comprising: operating a vehicle in a first driving state, the first driving state corresponding to a first set of logic for operating the vehicle, the first set of logic including logic for performing a first action at the vehicle in response to a determination that a first condition exists in the surroundings of the vehicle; while operating the vehicle in the first driving state, determining that state change criteria for transitioning from the first driving state to a second driving state are satisfied; and in response to the determination, operating the vehicle in the second driving state, the second driving state corresponding to a second set of logic, different from the first set of logic, for operating the vehicle, the second set of logic including logic for performing a second action, different from the first action, at the vehicle in response to a determination that the first condition exists in the surroundings of the vehicle.

Some examples of the disclosure are directed to a vehicle comprising: one or more sensors; one or more driving systems; one or more processors coupled to the one or more sensors and the one or more driving systems; and a memory including instructions, which when executed by the one or more processors, cause the one or more processors to perform a method comprising: operating the vehicle in a first driving state, the first driving state corresponding to a first set of logic for operating the vehicle, the first set of logic including logic for performing, using the one or more driving systems, a first action at the vehicle in response to a determination, using the one or more sensors, that a first condition exists in the surroundings of the vehicle; while operating the vehicle in the first driving state, determining that state change criteria for transitioning from the first driving state to a second driving state are satisfied; and in response to the determination, operating the vehicle in the second driving state, the second driving state corresponding to a second set of logic, different from the first set of logic, for operating the vehicle, the second set of logic including logic for performing, using the one or more driving systems, a second action, different from the first action, at the vehicle in response to a determination, using the one or more sensors, that the first condition exists in the surroundings of the vehicle.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
   one or more processors; and
   a memory including instructions, which when executed by the one or more processors, cause the one or more processors to perform a method comprising:
   operating a vehicle in a first driving state, the first driving state corresponding to a first set of logic for operating the vehicle, the first set of logic including logic for performing a first action at the vehicle in response to a determination that a first condition exists in the surroundings of the vehicle;
   while operating the vehicle in the first driving state, determining that state change criteria for transitioning from the first driving state to a second driving state are satisfied;
   in response to the determination, operating the vehicle in the second driving state, the second driving state corresponding to a second set of logic, different from the first set of logic, for operating the vehicle, the second set of logic including logic for performing a second action, different from the first action, at the vehicle in response to a determination that the first condition exists in the surroundings of the vehicle;
   the first driving state corresponds to a relaxed driving style,
   the second driving state corresponds to a hurried driving style, and
   determining that the state change criteria for transitioning from the first driving state to the second driving state are satisfied comprises determining, by the vehicle, that the vehicle will not reach a current destination of the vehicle within a given period of time while operating in the first driving state.

2. The system of claim 1, wherein the method further comprises:
   while operating the vehicle in the second driving state, determining that respective state change criteria for transitioning from the second driving state to a respective driving state are satisfied; and
   in response to the determination:
   in accordance with a determination that the respective state change criteria comprise state change criteria for transitioning from the second driving state to a third driving state, operating the vehicle in the third driving state, different from the first and second driving states; and
   in accordance with a determination that the respective state change criteria comprise state change criteria for transitioning from the second driving state to the first driving state, operating the vehicle in the first driving state.

3. The system of claim 1, wherein determining that the state change criteria for transitioning from the first driving state to the second driving state are satisfied is based on traffic characteristics in the vehicle's surroundings.

4. The system of claim 3, wherein the traffic characteristics are detected by one or more sensors on the vehicle.

5. The system of claim 1, wherein determining that the state change criteria for transitioning from the first driving state to the second driving state are satisfied is based on characteristics of objects detected in the vehicle's surroundings.

6. The system of claim 1, wherein determining that the state change criteria for transitioning from the first driving state to the second driving state are satisfied is independent of user input to the vehicle.

7. The system of claim 1, wherein operating the vehicle in the first driving state occurs while the vehicle is following a predetermined route from a first location to a second location, and operating the vehicle in the second driving state comprises operating the vehicle in the second driving state while continuing to follow the predetermined route from the first location to the second location.

8. The system of claim 1, wherein operating the vehicle in the first driving state occurs while the vehicle is following a predetermined route from a first location to a second location, and operating the vehicle in the second driving state comprises:
   adjusting the predetermined route to create an updated route from the first location to the second location; and
   operating the vehicle to follow the updated route from the first location to the second location.

9. The system of claim 1, wherein the method further comprises:
   determining, at a first time, that a second condition exists in the vehicle's surroundings, and that the second condition does not correspond to an existing driving state; and
   in response to determining that the second condition exists in the vehicle's surroundings, and that the second condition does not correspond to an existing driving state:
   operating the vehicle in a default driving state, not corresponding to the second condition;
   while operating the vehicle in the default driving state, monitoring a reaction of the vehicle to the existence of the second condition in the vehicle's surroundings; and
   creating a new driving state corresponding to the second condition in the vehicle's surroundings, and based on the reaction of the vehicle to the existence of the second condition in the vehicle's surroundings.

10. The system of claim 9, wherein the method further comprises:

determining, at a second time, after the first time, that the second condition exists in the vehicle's surroundings; and in response to determining that the second condition exists in the vehicle's surroundings, operating the vehicle in the new driving state corresponding to the second condition in the vehicle's surroundings.

11. The system of claim 1, wherein:

operating the vehicle in the first driving state comprises driving the vehicle in a first lane on a road, the state change criteria include a criterion that is satisfied when traffic in the first lane slows down, and traffic in a second lane is faster than the traffic in the first lane, and operating the vehicle in the second driving state comprises changing the vehicle from driving in the first lane to driving in the second lane.

12. The system of claim 1, wherein:

operating the vehicle in the first driving state comprises driving the vehicle on a road, the state change criteria include a criterion that is satisfied when an emergency vehicle is detected on the road in the surroundings of the vehicle, and operating the vehicle in the second driving state comprises moving the vehicle to a side of the road until the emergency vehicle passes the vehicle.

13. The system of claim 1, wherein:

operating the vehicle in the first driving state comprises driving the vehicle on a road, and determining a curvature of the road based on input from a first sensor indicative of characteristics of the road and input from a second sensor indicative of movement of a second vehicle in front of the vehicle, the input from the first sensor having a first confidence factor and the input from the second sensor having a second confidence factor, less than the first confidence factor, and operating the vehicle in the second driving state comprises driving the vehicle on the road, and determining the curvature of the road based on the input from the first sensor and the input from the second sensor, the input from the first sensor having a third confidence factor and the input from the second sensor having a fourth confidence factor, greater than the third confidence factor.

14. The system of claim 1, wherein:

operating the vehicle in the first driving state comprises driving the vehicle on a road at a first speed on a first predefined path based on input from a first sensor indicative of characteristics of objects in front of the vehicle, the state change criteria include a criterion that is satisfied when an object enters the first predefined path within a threshold distance of the vehicle, and operating the vehicle in the second driving state comprises reducing a speed of the vehicle from the first speed based on input from the first sensor indicative of the characteristics of the objects in front of the vehicle and a second sensor indicative of characteristics of objects behind the vehicle.

15. The system of claim 1, wherein determining that state change criteria for transitioning from the first driving state to the second driving state are satisfied is independent of driver input.

16. The system of claim 1, wherein the given period of time is input by a driver of the vehicle.

17. The system of claim 1, wherein the given period of time is automatically determined by the vehicle based on an estimated arrival time at the current destination of the vehicle while operating in the first driving state.

18. The system of claim 1, further comprising:

while operating the vehicle in the second driving state, determining that state change criteria for transitioning from the second driving state to the first driving state are satisfied, wherein determining that the state change criteria for transitioning from the first driving state to the second driving state are satisfied comprises determining, by the vehicle, that the given period of time has been extended; and in response to the determination, operating the vehicle in the first driving state.

* * * * *